United States Patent
Brose et al.

(10) Patent No.: US 7,875,820 B2
(45) Date of Patent: Jan. 25, 2011

(54) SWITCHING DEVICE HAVING WELDING TABS FOR SECURING SENSING STRUCTURES TO THE DEVICE HOUSING

(75) Inventors: Matthew Brose, Davis, IL (US); Michael Skarlupka, Freeport, IL (US); Gregory Laue, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 686 days.

(21) Appl. No.: 11/843,260

(22) Filed: Aug. 22, 2007

(65) Prior Publication Data

US 2009/0050452 A1 Feb. 26, 2009

(51) Int. Cl.
   *H01H 13/00* (2006.01)
   *H01H 3/00* (2006.01)
(52) U.S. Cl. .................... 200/329; 200/296
(58) Field of Classification Search ............ 200/329
   See application file for complete search history.

(56) References Cited

U.S. PATENT DOCUMENTS

| | | | |
|---|---|---|---|
| 2,859,313 A | 11/1958 | Connelly | |
| 4,709,133 A | 11/1987 | Mainville | |
| 5,626,222 A * | 5/1997 | Aguilera | 200/305 |
| 6,111,213 A | 8/2000 | Suchier | |
| 6,414,584 B1 | 7/2002 | Liu et al. | |
| 6,514,091 B2 | 2/2003 | Saito et al. | |
| 6,765,173 B2 | 7/2004 | Suzuki | |
| 2006/0086599 A1 * | 4/2006 | Flynn et al. | 200/329 |
| 2006/0089680 A1 | 4/2006 | Bruchmann et al. | |
| 2008/0156626 A1 * | 7/2008 | Buschmann | 200/302.2 |

FOREIGN PATENT DOCUMENTS

DE  102 37 904 A1  1/2004

OTHER PUBLICATIONS

European Search Report for EP 08 16 2646 mailed Dec. 7, 2009.

* cited by examiner

*Primary Examiner*—Renee Luebke
*Assistant Examiner*—Lheiren Mae A Caroc
(74) *Attorney, Agent, or Firm*—Ingrassia Fisher & Lorenz, P.C.

(57) ABSTRACT

A switching device includes a housing having an exterior surface with at least one opening in the surface. An inner edge of the opening is for receiving and securing solid bodies. At least a portion of the inner edge of the opening includes an integral weld tab which is raised above a level of the exterior surface. A sensing body includes a sensing structure operable to sense at least one condition. The sensing body has an outer surface that is disposed partially within the housing and secured to the edge of the opening by the weld tab, wherein the weld tab provides weld material physically bonding the outer surface of the sensing body to the housing.

17 Claims, 3 Drawing Sheets

SWITCHING DEVICE HAVING WELDING TABS FOR SECURING SENSING STRUCTURES TO THE DEVICE HOUSING

FIELD OF THE INVENTION

The invention relates to switching devices, and more particularly, the invention relates to switching devices having certain components secured to one another by weld material.

BACKGROUND

Certain switches require a thin body (e.g. bushing) having a movable portion coupled into and rigidly affixed to a housing (sometimes referred to as an enclosure). Assembly of such switches generally requires a welding operation to affix the thin body to an opening in the enclosure adapted for receiving the body. In some applications, the body and the housing need to be maintained at a substantially sealed level to permit proper operation. Having the body and housing substantially sealed prevents ingress of environmental factors that can cause failure of the switch to properly conduct an electrical signal, such as due to corrosion.

As known in the art, the body is inserted into an opening in a flat top portion of the housing to reach an o-ring which allows a seal to be formed. A welding operation then follows which removes material from the thin body and/or the housing to bond the respective components to one another.

Known weld techniques, such as tungsten inert gas (TIG) welding, generally involve the arc being directed at the flat top surface of the housing in an attempt to push or splatter molten material on to the wall of the bushing to create a weld. Without a well defined target it was found by the present inventors that frequently excessive weld arc energy was inadvertently applied directly to the thin wall of the bushing, and a high level of operator skill was required to obtain acceptable welds that did not compromise the seal integrity of the switch.

For example, during assembly of sealed plunger limit switches, poor yield can occur due to product failing the environmental seal test which tests for seal integrity. One requirement imposed for such switches in certain applications, such as for monitoring whether and to what extent cockpit door is ajar, is the military specification, that being $\leq 10^{-6}$ cm$^3$/sec for the leak rate. The cause for these leaks has been traced by the present inventors to generally be holes or excessively thin regions in the body created in the thin bushing walls during welding of a housing to the bushing. What is needed is switches having a new thin body or housing arrangement and related process that is less operator dependent and thus more manufacturable that better preserves the seal integrity of the switches.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A switching device includes a housing having an exterior surface with at least one opening in the surface. An inner edge of the opening for receiving and securing solid bodies, at least a portion of the inner edge of the opening including an integral weld tab raised above a level of the surface. A sensing body comprising a sensing structure is operable to sense at least one condition. The sensing body has an outer surface disposed partially within the housing and secured to the edge of the opening by the weld tab, wherein the weld tab provides weld material physically bonding the outer surface of the sensing body to the housing. In one embodiment the housing is a sealed housing providing a 25° C. leak rate of $\leq 10^{-6}$ cm$^3$/s of helium at one atmosphere differential pressure between an interior and an exterior of the housing.

In one embodiment the sensing structure comprises a movable portion which is operable to move inside the housing responsive to the condition, and the housing further comprising at least one electrical component for receiving the movable portion when the condition exceeds a threshold. The housing can comprise a sealed base portion and a collar portion, wherein the collar includes the integral weld tab(s) and is secured to the base portion. In one embodiment, the collar is removeably secured to the base portion.

The weld tab can be oriented substantially normal to the exterior surface. In one embodiment, the weld tab comprises a plurality of spaced apart weld tabs. The sensing body can be a thin cylindrical bushing, such as having a wall thickness of less than 1.27 mm. In one embodiment the housing, the weld tab and the sensing body all comprise stainless steel.

A method of manufacturing a switching device comprising a housing having an exterior surface including at least one opening in the surface, at least a portion of an inner edge of the opening including an integral weld tab raised above a level of the surface, and a sensing body, comprises the step of inserting a sensing body into the opening to reach partially within the housing. The weld tab is then welded to provide weld material to physically bond an outer surface of the sensing body to the housing. In one embodiment the housing is a sealed housing providing a 25° C. leak rate of $\leq 10^{-6}$ cm$^3$/s of helium at one atmosphere differential pressure between an interior and an exterior of the housing. The welding step can comprise tungsten inert gas (TIG) welding and the housing, weld tab and the sensing body all comprise stainless steel. In one embodiment the sensing structure comprises a movable portion which moves inside the housing responsive to at least one condition, the housing further comprising at least one electrical component for receiving the movable portion when the condition exceeds a threshold.

A multi-plunger limit switch comprises a sealed housing having an exterior surface with at least one opening in the surface, an inner edge of the opening for receiving and securing solid bodies, at least a portion of the inner edge of the opening including an integral weld tab raised above a level of the exterior surface, wherein the housing comprises a base portion and a collar portion. The collar includes the weld tab and is secured to the base portion. At least a first and second cylindrical sensing body are included and comprise a sensing structure including a plunger. The first and second sensing body having an outer surface disposed partially within the housing and are secured to the edge of the opening by the weld tab, wherein the weld tab provides weld material physically bonding the outer surface to the housing. The plunger is operable to moves inside the housing responsive to contact with an object, the housing further comprising electrical component operable to switch the witching device when a distal end of the plunger is received responsive to the object pushing against the plunger.

BRIEF DESCRIPTION OF THE DRAWINGS

A filler understanding of the present invention and the features and benefits thereof will be accomplished upon review of the following detailed description together with the accompanying drawings, in which.

DETAILED DESCRIPTION

Figure 1:
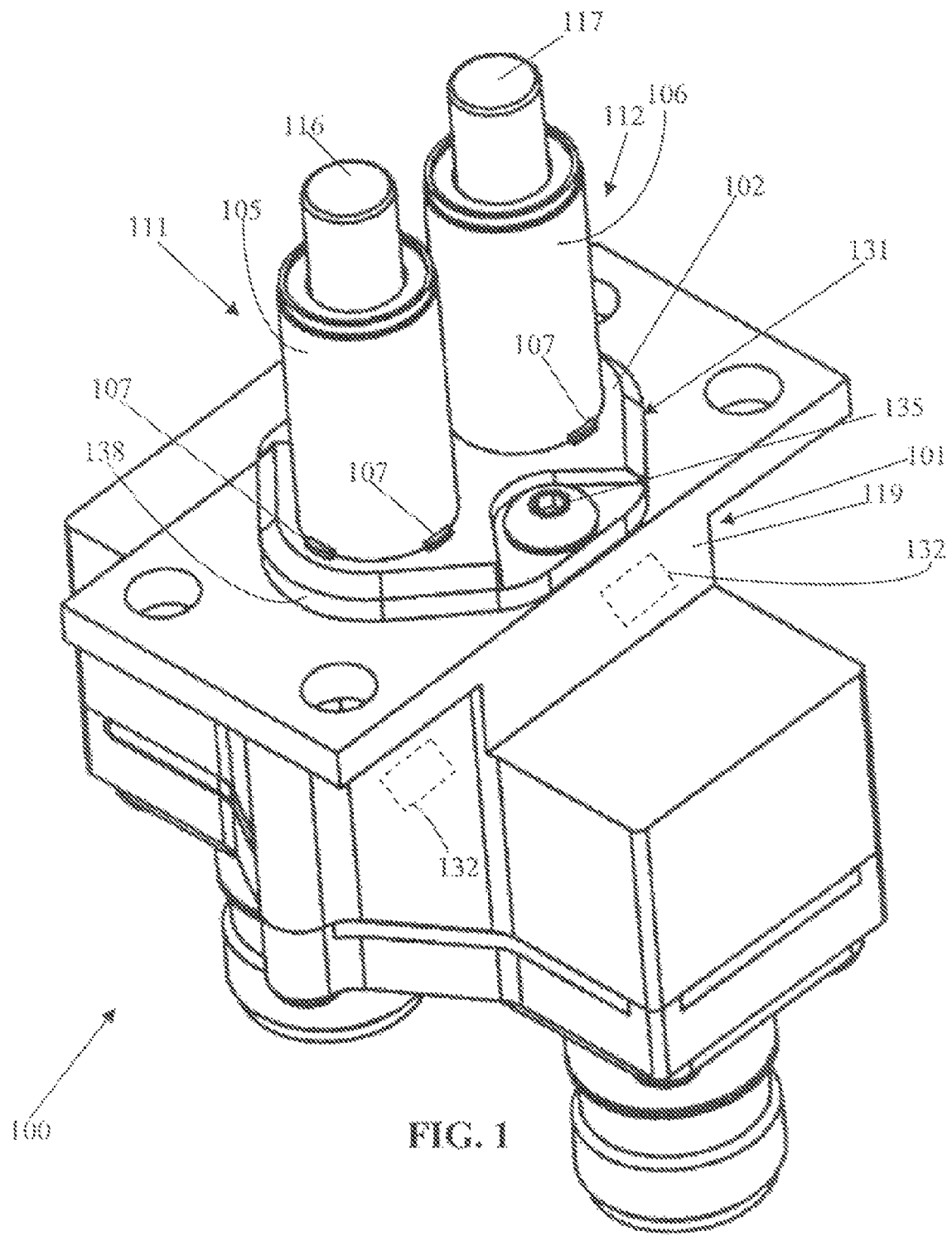
FIG. 1 is an isometric view of a switching device including weld tabs securing a pair of sensing structures to a collar which is affixed to a housing body, according to an embodiment of the invention.

FIG. 1 is a drawing of a switching device 100 according to an embodiment of the present invention. Switching device 100 includes a housing 101 having an exterior surface shown as top surface 102 with at least one opening in the exterior surface (see collar 131 shown in FIG. 2 having openings 121 and 122). As shown in FIG. 1, housing 101 comprises a sealed base portion 111 and a collar portion 131 wherein the collar includes raised integral weld tabs 107. Collar 131 is secured to the base portion 111, such as using bolts 135, and can be sealed with an o-ring seal 138 therebetween.

As used herein, an "integral" weld tab refers to the weld tab material being essentially the same material (composition and morphology) as the structure the weld tabs are attached to, wherein no discernable interface exists between the weld tabs and the structure the weld tabs are attached to. Such a structure can be provided as described below by forming the material for weld tabs in the same forming process as the process to form the structure the weld tabs are attached to (e.g. collar 131 in FIG. 1). Following welding, the morphology of weld material generally changes, particularly near the end of the weld tab remote from the structure the weld tabs are attached to. In one embodiment, following the weld operation, the weld tab portion proximate to the structure the weld tabs are attached thereto can remain essentially unchanged, thus remaining the essentially the same material (composition and morphology) as the material the structure and the weld tabs are attached to.

An inner edge of the openings of collar 131 are for receiving and securing solid bodies, such as bushings 105 and 106 shown. At least a portion of the inner edge of opening 121 and 122 includes an integral weld tab 107 which is raised above a level of the top surface 102.

The number, position and size of the weld tabs 107 may vary depending on the design. In the embodiment shown in FIG. 1, there are three (3) weld tabs shown to secure each bushing to collar 131. The weld tabs for each bushing positioned about 90 degrees from one another. There are no weld tabs shown in the region between the bushings 105 and 106. This arrangement may be required when the design of the switching device requires bushings 105 and 106 to be too close together to allow for welding to occur at points between the bushings.

In other embodiments, there may be more or less weld tabs 107, and space permitting, weld tabs can be substantially equally spaced around the bushing. In one embodiment the weld tab is a continuous lip around the inner edge of the openings 121 and 122.

Bushings 105 and 106 are part of sensing bodies 111 and 112, respectively. Sensing bodies 111 and 112 include movable plungers 116 and 117 which are operable to sense at least one condition, such as contact by an object. The outer surface of the sensing body is disposed partially within the housing 101 and secured to the edge of the opening by the weld tabs 107. The weld tab 107 thus provides the weld material to physically bond the outer surface of the sensing body 111 and 112 to the housing 101. In one embodiment, all components are formed, or at least coated, by stainless steel. As known in the art, stainless steel refers to any of various steels alloyed with at least 10 percent chromium and sometimes containing other elements and that are resistant to corrosion or rusting associated with exposure to oxidants such as water and moist air.

Housing 101 is shown having electrical components 132 inside for receiving movable plungers 115 and 116 which move down when the condition sensed exceeds a threshold. Electrical components 132 generally comprise of one or more generally unsealed basic switch elements containing electrical contacts, and an actuating lever to transmit motion from plungers 115 and 116 to the basic switch elements, and a bracket to retain basic switch elements and lever to bushings 105 or 106. When plungers 115 and 116 are sufficiently depressed, the electrical contacts in electrical components 132 change state, and switching device 100 indicates the condition sensed (e.g. produce an alarm or send a control signal to a controller).

The one or more electrical components 132 within the housing 101 may be coupled electrically to components that are outside of the housing. For example, one or more electrical leads (not shown) may be coupled to suitable receptacles. To protect internal electrical components while permitting electrical connections with external components, the housing 101 may include one or more feedthroughs (not shown) that maintain the sealed nature of the housing 101.

As used herein, "sealed" generally refers to a leak rate defined by United States MIL-PRF-8805, symbol 4 (environmental), namely $\leq 10^{-6}$ cm$^3$/s of helium at one atmosphere differential pressure between an interior and an exterior of portion of interest, such as the housing.

Figure 2:
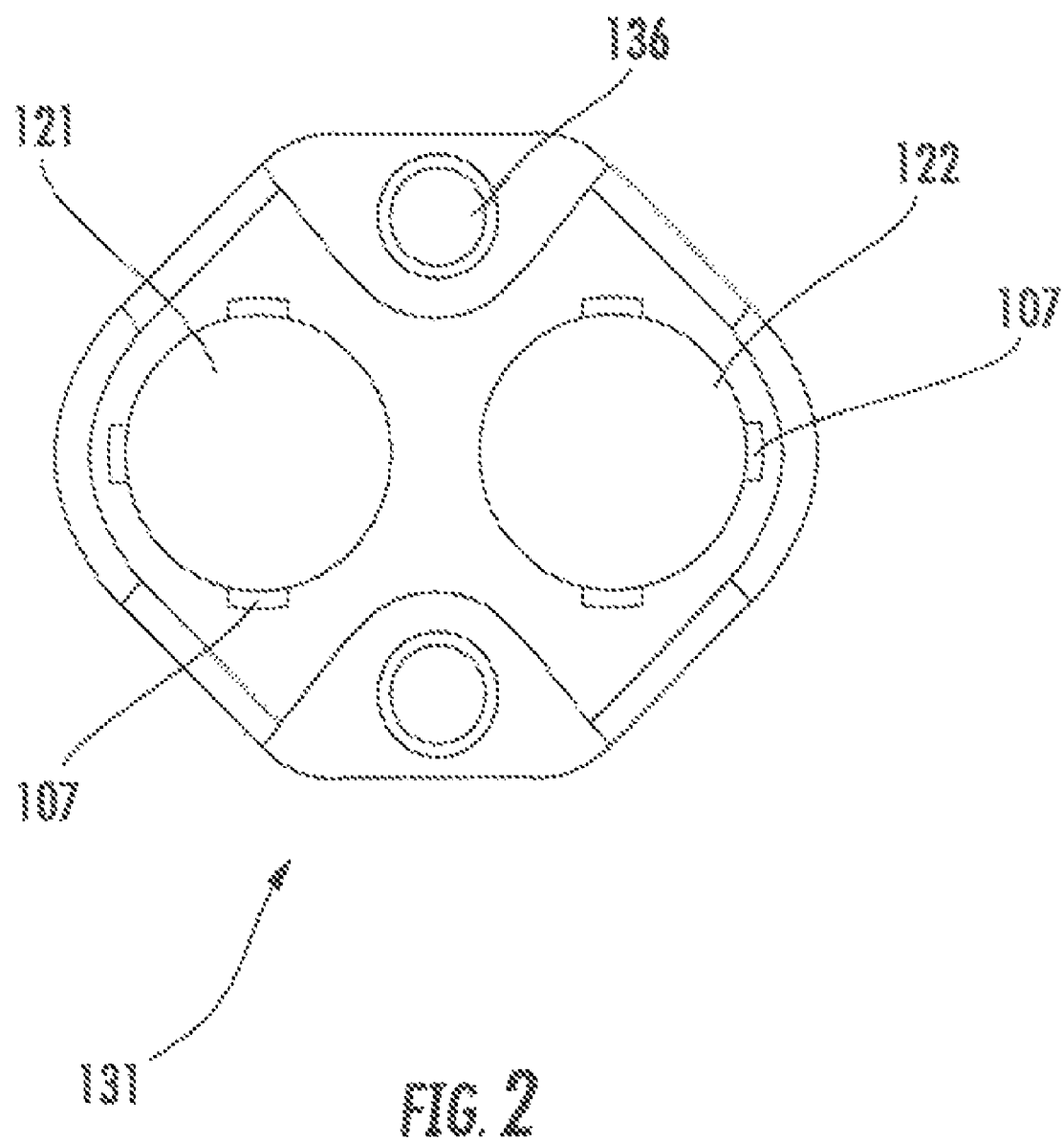
FIG. 2 shows a collar having a plurality of integrated raised weld tabs according to an embodiment of the invention.

FIG. 2 shows a collar 131 having a plurality of integrated raised weld tabs 107 according to an embodiment of the invention. Weld tabs 107 are shown oriented 90 degrees relative to one another. Collar portion 131 is secured to the base portion 111, by using bolts through bolt holes 136. Bolt holes 136 allow collar 131 to be removeably secured to the top of housing 101. As noted above, the inner edge of the openings 121 and 122 are for receiving and securing solid bodies, such as bushings 105 and 106 shown in FIG. 1. At least a portion of the inner edge of the opening 121 and 122 including an integral weld tab 107 raised above a level of the top surface 102.

The addition of the raised weld tabs 107 to housings at the desired weld locations provides a controlled amount of material to be reflowed by a welder to create the desired weld between the sealed housing 101 and solid bodies such as bushings 105 and 106 shown in FIG. 1. The thickness of the bushings associated with plungers 105 and 106 are generally <2.5 mm, such as <1.27 mm (0.05 inches). The weld used can be TIG welding or other welding which provides sufficient energy to melt stainless steel. The weld tab provides a target for the arc energy delivered by the TIG welder. The weld tab also acts as a thermal shield so that excessive weld arc energy is not applied directly to the thin wall of the bushing or other body. Moreover, weld tabs according to one embodiment of the invention provides of a fixed amount of weld material. The weld tab has been found to allow good welds to be achieved at lower energy levels, and even if a small gap exists between the body and the enclosure to be welded.

As noted in the background, prior to the present invention, previous weld techniques generally required the arc to be directed at the flat top surface of the housing in an attempt to push or splatter material on to the wall of the solid body to be secured, such as a bushing, to create a weld. Without a well defined target it was a frequent occurrence that excessive weld arc energy was applied directly to the thin wall of the solid body, and a high level of operator skill was required to obtain acceptable welds.

Results similar to this invention may be achievable through the use of filler rod. However, the use of filler rod is operator dependent. In contrast, the present invention provides an essentially fixed amount of weld material. The material provided by weld tabs according to the present invention can comprise the same composition (e.g. same grade of stainless steel) as the housing and the solid body which thus provides better corrosion resistance than would be obtained from a filler of a different material or different grade of stainless steel.

Figure 3:
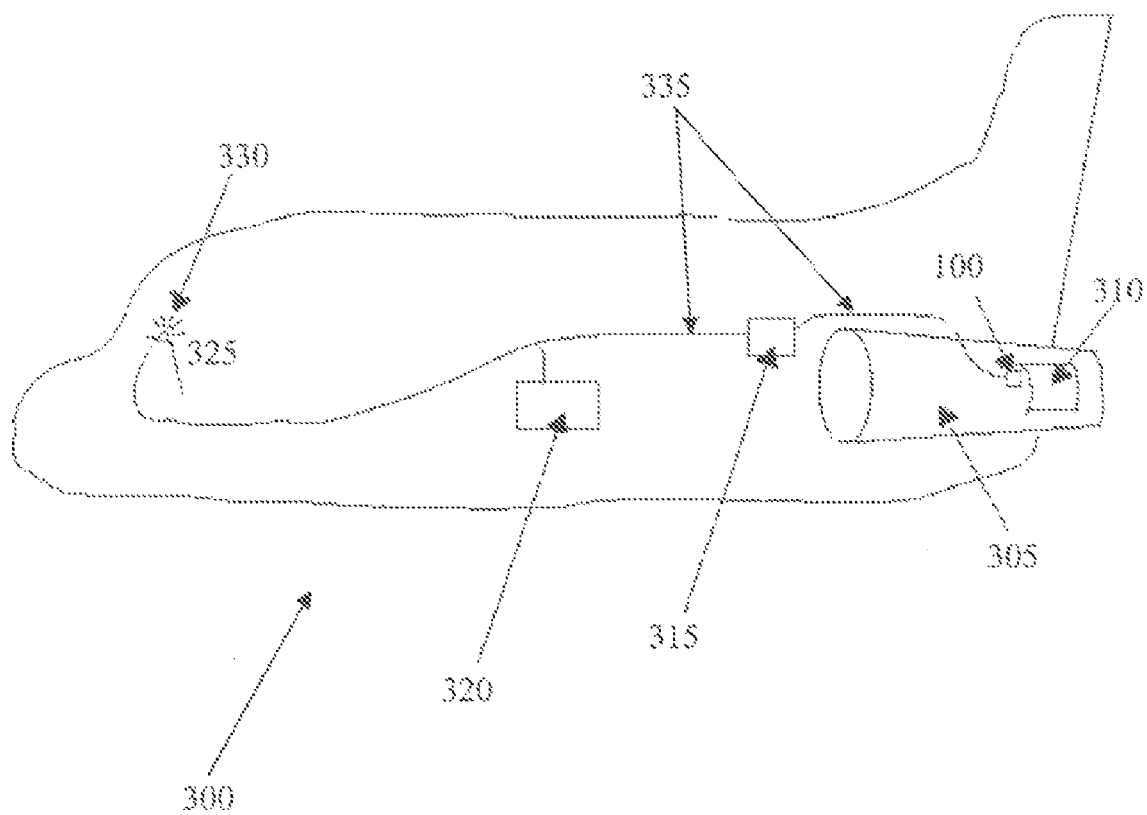
FIG. 3 is a depiction of a jet aircraft comprising a sensing system including a switch according to an embodiment of the present invention for sensing and transmitting thrust reverser door status information.

Regarding aircraft applications, switches according to the invention can be used, for example, to detect the position of landing gear, control surfaces (flaps, rudder, and ailerons), doors (cargo, passenger, and thrust reverser). FIG. 3 shows a jet aircraft 300 comprising a sensing system including a switch 100 according to an embodiment of the present invention. Switch 100 is shown within the jet engine nacelle 305. In the embodiment shown the thrust reverser door state information is communicated by switch 100 via wires to fill authority digital engine control (FADEC; main computer) 315, main flight computer 320 and cockpit 325. If the door is closed, the switch 100 senses whether or not the door is latched (locked). Cockpit can include a light 330 indicating thrust reverser door status to the pilot.

Although wired connections 335 are shown, other connections can be used, such as fiber-optic connections. In one switch 100 arrangement, electrical continuity can exist between a particular pair of wires entering the switch (e.g. wires #1 and #2) when the thrust reverser door is closed, but when the door opens, the electrical contacts in switch 100 changes state, and there then can be continuity between a different pair of wires, (wires #1 and #3). In operation of aircraft 300, based on input from the switch 100, the FADEC 315 can issue commands to actuators that open/close the thrust reverser door 310, commands to actuators that operate the latch mechanism, or commands to implement other functions. Although not shown, aircraft 300 can include other switches 100 according to the invention, such as located at cargo/passenger doors, around the landing gear, at the control surfaces (e.g. flaps).

Although described related to a switch, specifically a dual plunger limit switch, the invention is not limited to a specific number of sensing devices associated with the switch, nor to switches.

EXAMPLES

A simplified prototype switch was fabricated using an embodiment of the present invention. A simplified collar was machined to provide a single central circular opening along with a plurality of integral weld tabs spaced apart along the edge of the opening. A 0.030 inch (0.762 mm) thick bushing was provided. The collar was placed on a table to provide a backing. The bushing was inserted into the collar.

To produce the weld tabs, the machining of the housing was designed to leave the desired size of weld tab at the desired weld locations. In one embodiment, the weld tab size was 0.020 inches high (0.508 mm), 0.020 inches thick (0.508 mm) and 0.090 inches wide (2.286 mm). The processing conditions to weld the thin walled bushing to the machined stainless steel collar having raised integrated weld tabs were a TIG weld with arc setting of 35 amps and 0.2 seconds dwell per tab. These conditions were found to provide an acceptable weld without creating a measurable leak path through the bushing wall.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A switching device, comprising:
a housing having an exterior surface with at least one opening in said surface, an inner edge of said opening for receiving and securing solid bodies, at least a portion of said inner edge of said opening including an integral weld tab raised above a level of said surface;
a sensing body comprising a sensing structure operable to sense at least one condition, said sensing body having an outer surface disposed partially within said housing and secured to said edge of said opening by said weld tab, wherein said weld tab provides weld material physically bonding said outer surface of said sensing body to said housing, said weld material essentially identical to that of the outer surface of said sensing body, whereby no discernable interface exists between said weld tab and said outer surface of said sensing body.

2. The device of claim 1, wherein said housing is a sealed housing providing a 25° C. leak rate of $\leq 10^{-6}$ cm$^3$/s of helium at one atmosphere differential pressure between an interior and an exterior of said housing.

3. The device of claim 1, wherein said sensing structure comprises a movable portion which is operable to move inside said housing responsive to said condition, said housing further comprising at least one electrical component for receiving said movable portion when said condition exceeds a threshold.

4. The device of claim 1, wherein said housing comprises a sealed base portion and a collar portion, wherein said collar includes said weld tab and is secured to the base portion.

5. The device of claim 4, wherein said collar is removeably secured to said base portion.

6. The device of claim 1, wherein said weld tab is oriented substantially normal to said exterior surface.

7. The device of claim 1, wherein said weld tab comprises a plurality of spaced apart weld tabs.

8. The device of claim 1, wherein said sensing body is a cylindrical bushing having a wall thickness of less than 1.27 mm.

9. The device of claim 1, wherein said housing, said weld tab and said sensing body all comprise stainless steel.

10. A method of manufacturing a switching device comprising a housing having an exterior surface including at least one opening in said surface, at least a portion of an inner edge of said opening including an integral weld tab raised above a level of said surface, and a sensing body, comprising the steps of:
inserting a sensing body into said opening to reach partially within said housing, and
welding said weld tab to provide weld material to physically bond an outer surface of said sensing body to said housing, said weld material essentially identical to that of the outer surface of said sensing body, whereby no discernable interface exists between said weld tab and said outer surface of said sensing body.

11. The method of claim 10, wherein said housing is a sealed housing providing a 25° C. leak rate of $\leq 10^{-6}$ cm$^3$/s of helium at one atmosphere differential pressure between an interior and an exterior of said housing.

12. The method of claim 10, wherein said welding comprises tungsten inert gas (TIG) welding and said housing, said weld tab and said sensing body all comprise stainless steel.

13. The method of claim 10, wherein said sensing structure comprises a movable portion which moves inside said housing responsive to at least one condition, said housing further comprising at least one electrical component for receiving said movable portion when said condition exceeds a threshold.

14. A multi-plunger limit switch, comprising:
a sealed housing having an exterior surface with at least one opening in said surface, an inner edge of said opening for receiving and securing solid bodies, at least a portion of said inner edge of said opening including an integral weld tab raised above a level of said exterior surface, said housing comprising a base portion and a collar portion, wherein said collar includes said weld tab and is secured to said base portion;
at least a first and second cylindrical sensing body comprising a sensing structure including a plunger, said first and second sensing body having an outer surface disposed partially within said housing and secured to said edge of said opening by said weld tab, wherein said weld tab provides weld material physically bonding said outer surface to said housing, said weld material essentially identical to that of the outer surface of said sensing body, whereby no discernable interface exists between said weld tab and said outer surface of said sensing body,
wherein said plunger moves inside said housing responsive to contact by an object, said housing further comprising electrical component operable to switch said switching device when a distal end of said plunger is received responsive to said object pushing against said plunger.

15. The limit switch of claim 14, wherein said weld tab comprises a plurality of spaced apart weld tabs.

16. The limit switch of claim 14, wherein said sensing body has a wall thickness of less than 1.27 mm.

17. The limit switch of claim 14, wherein said housing, said weld tab and said sensing body all comprise stainless steel.

* * * * *